(12) United States Patent
Mulich et al.

(10) Patent No.: US 6,851,391 B1
(45) Date of Patent: Feb. 8, 2005

(54) APPARATUS FOR CLEANING AN ANIMAL'S PAW

(75) Inventors: Katie Mulich, Louisberg, KS (US); Michael Mulich, Louisberg, KS (US)

(73) Assignee: Paw Wash LLC, Leawood, KS (US)

( * ) Notice: Subject to any disclaimer, the term of this patent is extended or adjusted under 35 U.S.C. 154(b) by 0 days.

(21) Appl. No.: 10/623,297

(22) Filed: Jul. 18, 2003

(51) Int. Cl.$^7$ ............................................... A01K 13/00
(52) U.S. Cl. ........................ 119/651; 119/664; 119/673; 15/104.92
(58) Field of Search .......................... 215/382; 119/651, 119/652, 664, 673; 15/104.92; 601/166; 4/594, 622

(56) References Cited

U.S. PATENT DOCUMENTS

| | | | | |
|---|---|---|---|---|
| 438,931 A | * | 10/1890 | Martinot | 4/622 |
| 874,983 A | * | 12/1907 | O'Brian et al. | 168/2 |
| 1,970,465 A | * | 8/1934 | Martindell et al. | 4/622 |
| 3,064,296 A | | 11/1962 | Lidke | |
| 3,286,711 A | * | 11/1966 | MacLeod | 601/11 |
| 3,378,004 A | | 4/1968 | Claycomb et al. | |
| 3,825,141 A | * | 7/1974 | Campagna | 215/12.2 |
| 4,215,491 A | | 8/1980 | Giannetti | 36/8.1 |
| 4,317,431 A | | 3/1982 | Sparkes | 119/651 |
| 4,505,229 A | | 3/1985 | Altissimo | |
| 4,583,530 A | * | 4/1986 | Henley | 601/158 |
| 4,630,744 A | * | 12/1986 | Trombly | 220/604 |
| 5,321,867 A | | 6/1994 | Probst | 15/160 |
| 5,758,370 A | * | 6/1998 | Schwartz | 4/622 |
| 5,774,909 A | | 7/1998 | Stable | |
| 6,269,512 B1 | * | 8/2001 | Thomson et al. | 15/104.92 |
| 6,439,160 B1 | | 8/2002 | Wheelwright | |

* cited by examiner

Primary Examiner—Robert P. Swiatek
(74) Attorney, Agent, or Firm—Hovey Williams LLP

(57) ABSTRACT

An apparatus (10) for cleaning an animal's paw broadly comprises an elongated rigid cylindrical sidewall (12) having an end wall (14) and an open rim (16) which substantially seals to an animal's paw as the paw is withdrawn from the apparatus (10). The rim (16) is preferably fluted such that the paw is guided into the apparatus (10) without snagging or catching. A cleaning element (20) may be located within the apparatus (10) to assist in cleaning the paw. The cleaning element (20) may be a sponge (34), a brush (38), a plurality of projections (40), or other related object. In use, the apparatus (10) is partially filled with a liquid (18) and the paw is inserted through the rim (16) and into the apparatus (10). A user then agitates the paw within the apparatus (10) such that the paw is cleaned by contacting the cleaning element (20). The user then withdraws the paw from the apparatus (10), thereby creating a suction effect which draws additional dirt and debris away from the paw.

18 Claims, 5 Drawing Sheets

APPARATUS FOR CLEANING AN ANIMAL'S PAW

BACKGROUND OF THE INVENTION

1. Field of the Invention

The present invention relates to cleaning devices for animal paws. More particularly, the present invention relates to an apparatus for individually cleaning an animal's paw that can be easily moved, stored, maintained and operated.

2. Description of the Prior Art

Animals' paws often become dirty through contacting various outdoor substances such as mud or dirt. Then, upon reentering a home, the animals track the mud or dirt throughout the home. Therefore, it is often necessary to clean animals and their paws before allowing them to reenter the home.

Devices such as the one disclosed in U.S. Pat. No. 6,439,160, have been developed to aid in cleaning animal paws. The devices generally consist of large enclosures which allow animals to be cleaned while containing runoff, waste, and cleaning solutions within the enclosures. These enclosures are typically large basins in which animals place all four paws, or containers that enclose entire animals except for their heads. Thus, enclosures found in the prior art are generally the same size or larger than the animal to be cleaned and are thus cumbersome to use, move, and store.

Prior art devices also require a variety of mechanical and electrical components to scrub, wash, and clean animals. These mechanical and electrical components further increase the size and weight of the devices. Thus, animals must generally be transported to the devices thereby creating a risk that dirt, debris, and waste will be further spread. Additionally, because these devices cannot be easily moved, especially when filled with water, a drain must be nearby to dispose of waste and runoff that results from cleaning animals.

Further, the use of mechanical means for scrubbing, washing, and cleaning animals' paws exposes animals to a degree of unwarranted risk as animals may be exposed to excessive pressures or forces without the users' knowledge or control. Large enclosures, mechanical means for scrubbing, and limited control by users may additionally frighten animals making it difficult to contain or control the animals. Additionally, the complex nature of prior art devices, and their many moving parts, demand that users keep the devices in good working order.

Accordingly, there is a need for an improved apparatus for cleaning animal paws that overcomes the limitations of the prior art. More particularly, there is a need for an apparatus which can clean a single paw, is inexpensive and easy to use, is portable and easily stored, and provides for easy disposal of waste water.

SUMMARY OF THE INVENTION

The present invention solves the above-described problems and provides a distinct advance in the art of cleaning devices for animal paws. More particularly, the present invention provides an apparatus for individually cleaning each of an animal's paws that can be easily moved, stored, maintained and operated.

The apparatus broadly includes a elongated rigid cylindrical sidewall, an end wall, and an open rim. The end wall closes one end of the sidewall such as to allow the apparatus to contain a liquid. The rim is positioned on the end of the sidewall opposite to the end wall and is sized and configured to receive the paw and substantially seal to the paw. The rim is sized and configured by selecting the internal diameter of the rim based on the size of the paw such that the paw may freely move through the rim and into the apparatus, while still fitting snugly through the rim. The snug fit of the paw within the rim allows the rim to substantially seal to the paw which creates a suction effect as the paw is withdrawn from the apparatus. The suction effect pulls water, dirt and other debris away from the paw.

A cleaning element may be located inside the apparatus to assist in cleaning the paw. The cleaning element may be a sponge, a brush, a plurality of projections extending inwardly, or any other similar element. The cleaning element is positioned inside the apparatus such that it cleans the paw through contact when the paw is inserted into the apparatus. Thus, the paw may be cleaned by the combination of the suction effect and the cleaning element.

The apparatus may additionally include identifying markings and a gripping element on its exterior surface. The identifying markings allow the apparatus to be quickly identified and the gripping element assists with gripping and holding onto the apparatus while in use.

In operation, the apparatus is first partially filled with a liquid. The liquid may be a cleaning solution, water, water with detergent, shampoo, or any other solution suitable for cleaning animal paws. An animal paw is then inserted through the rim and into the liquid. Once the paw is inserted in the apparatus, the user agitates the apparatus or the paw such that the paw is cleaned by contacting the cleaning element. As the user withdraws the paw from the apparatus, the rim substantially seals to the paw, thereby creating the suction effect which draws dirt and debris away from the paw. Once the user removes the paw from the apparatus, he or she disposes of any remaining waste by dumping the contents of the apparatus into a drain or other receptacle. The apparatus may then be stored without any further attention until its next use.

By constructing the apparatus as described herein, numerous advantages are realized. For example, an animal's paw may be selectively cleaned without expending considerable time and effort that would be needed to clean the entire animal. Additionally, because the apparatus is small and lightweight, it may be easily moved to the animal's location thereby eliminating the need to transport the animal. Furthermore, the runoff and waste that results from cleaning the paw is contained within the apparatus allowing easy cleanup and disposal of the waste. A further advantage is that the paw may be quickly cleaned with a single device, and without exposing the animal to any danger caused by excessive scrubbing, washing, or force applied by an automated device. These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
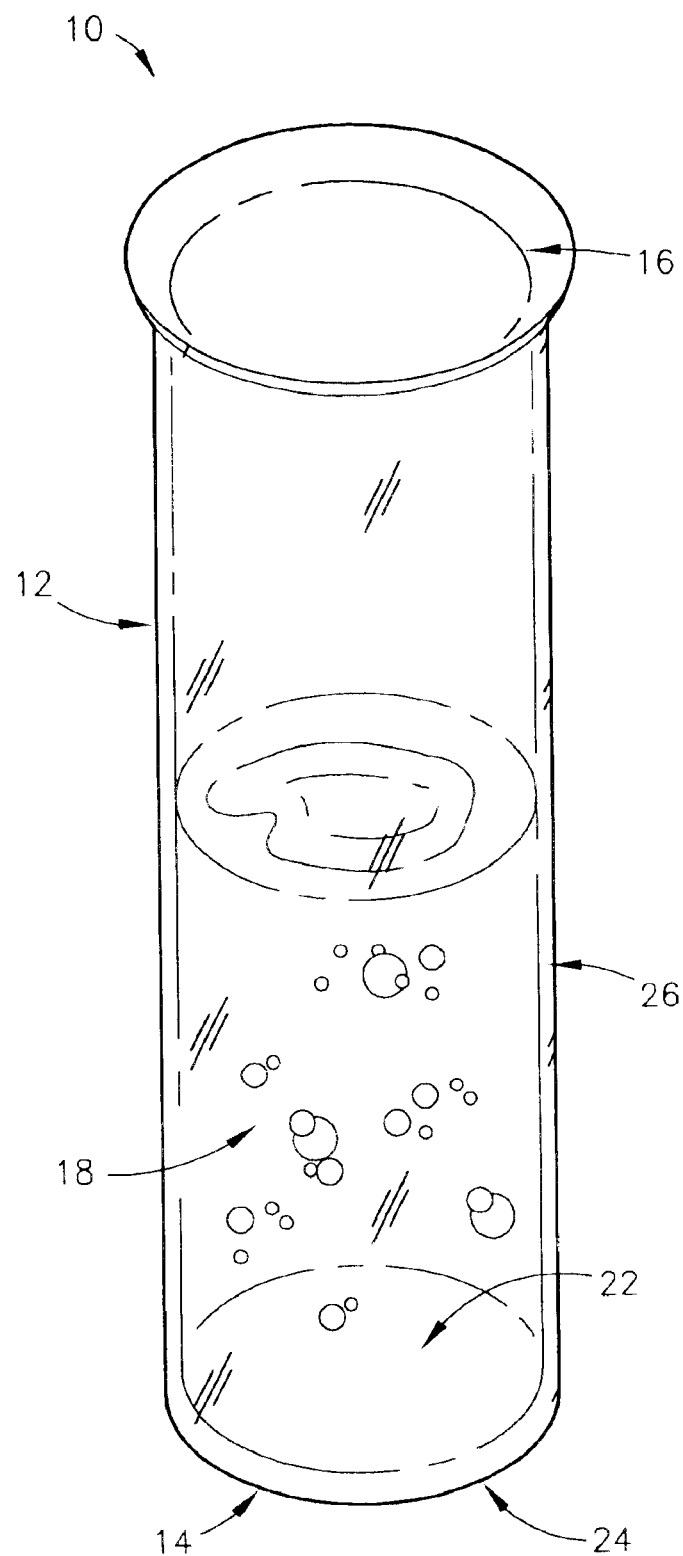
FIG. 1 is a perspective view of an apparatus for cleaning an animal's paw constructed in accordance with a preferred embodiment of the present invention having a transparent sidewall.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIG. 1, an apparatus 10 for cleaning an animal's paw constructed in accordance with a preferred embodiment of the invention is illustrated and broadly comprises an elongated rigid cylindrical sidewall 12, an end wall 14, and an open rim 16. The end wall 14 closes one end of the sidewall 12 such as to allow the apparatus 10 to contain a liquid 18. The rim 16 is positioned on an end of the sidewall 12 opposite to the end wall 14. A cleaning element 20 may be located within the apparatus 12 to assist in the cleaning of the paw.

The rim 16 is preferably fluted such that the paw is safely guided into the apparatus 10 by the shape of the rim 16 without catching or snagging. The rim 16 is sized and configured by having an internal diameter selected based on the size of the paw such that the paw may freely move through the rim 16 and into the apparatus 10, while still fitting snugly through the rim 16. The size and configuration of the rim 16 allows the rim 16 to receive the paw and substantially seal to the paw due to the snug fit of the paw through the rim 16. Thus, a suction effect is created as the paw is withdrawn from the apparatus 10 due to the rim 16 substantially sealing to the paw. The suction effect pulls water, dirt, and other debris away from the paw.

The internal diameter of the rim and the internal diameter of the sidewall are preferably equal, thereby forming a uniform cylindrical structure. The internal diameter of the sidewall is selected based on the size of the paw such that the paw may freely move into the apparatus 10, while still fitting snugly within the apparatus 10. The sidewall 12 preferably has an internal diameter between one and three inches, a length between four and eight inches, an external diameter between one and one-sixteenth of an inch and four inches, and a thickness between one-sixteenth of an inch and one-half of an inch. The dimensions of the sidewall 12 and rim 16 may vary according to the size the paw to allow the rim to be the same size or only slightly larger than the paw, to ensure the snug fit of the paw through the rim 16. Thus, the dimensions of the sidewall 12 and rim 16 would be greater for a large animal than for a small animal. Additionally, the dimensions of the sidewall 12 and rim 16 may be selected based on the size of an animal's leg such as to allow the leg to be inserted through the rim 16 and into the apparatus 10. Therefore, the leg, or portions of the leg in addition to the paw, may be cleaned by the apparatus 10 in the same manner as the paw.

The end wall 14 has an interior portion 22 to which the cleaning element 20 may be connected. The interior portion 22 may contain a connecting element for the cleaning element 20. The end wall 14 also includes an exterior portion 24 which is substantially flat so that the apparatus 10 may stand upright as depicted for easy storage. The end wall 14 also may be detachable from the sidewall 12 to allow the apparatus 10 to be easily cleaned.

Figure 2:
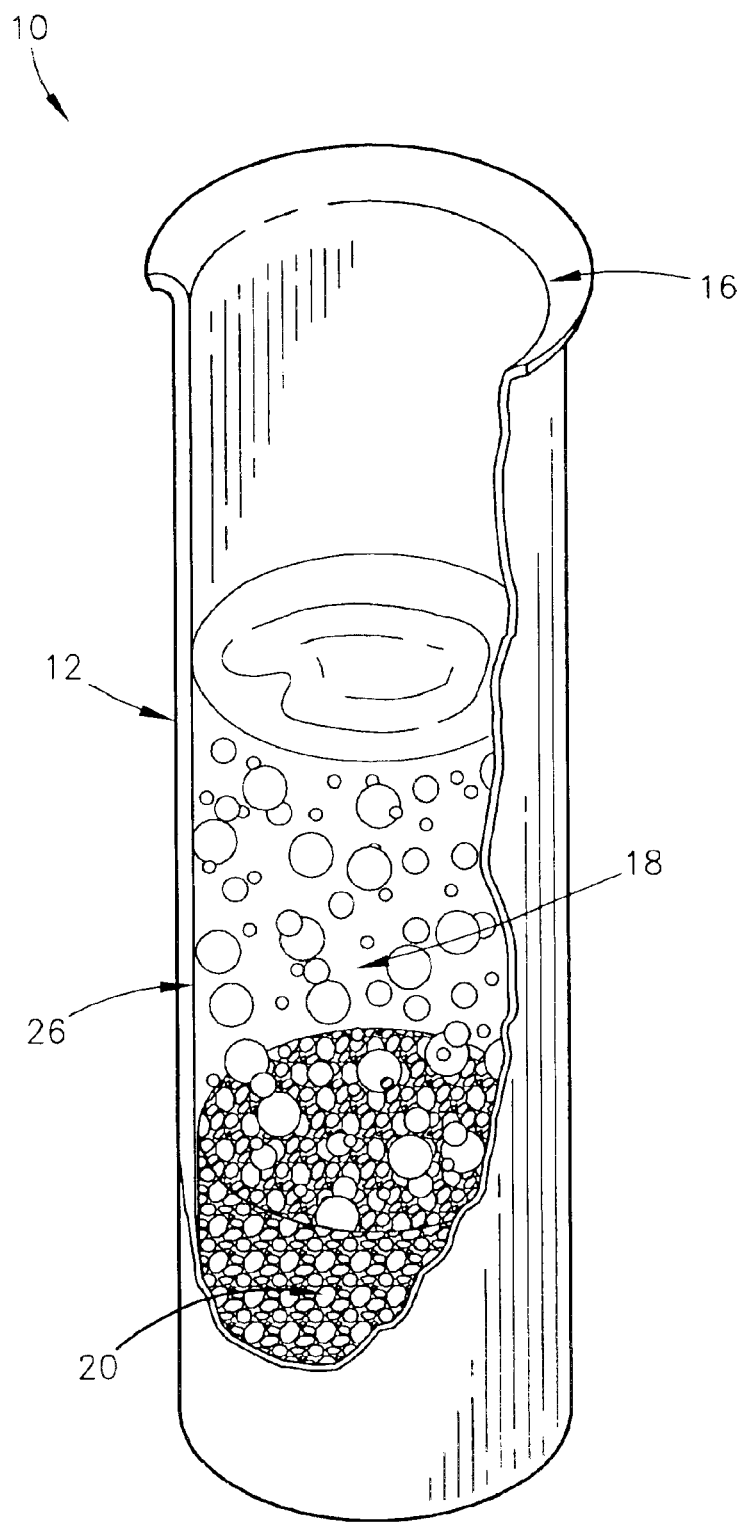
FIG. 2 is a fragmentary view of an alternative embodiment of the apparatus having an opaque sidewall.

The sidewall 12 and end wall 14 may be constructed of any material that is rigid and capable of retaining a liquid, including a wide variety of plastics, metals, glass, or other common and inexpensive materials. Ideally, the material is durable, lightweight, and easily cleaned. In one embodiment illustrated in FIG. 1, the sidewall 12 is constructed out of a transparent material thereby allowing the paw to be viewed through the sidewall 12. In another embodiment, the sidewall 12 may be constructed out of an opaque material, such as shown in FIG. 2. The rim 16 may be constructed of the same material as the sidewall 12, or it may be constructed of a flexible or pliable material to assist in creating the seal and guiding the paw into the apparatus 10.

The sidewall 12 has an interior surface 26 that assists in the cleaning of the paw by rubbing water, dirt and debris off the paw through contact. The interior surface 26 may have ridges, ribs, or other formations designed to further aid in rubbing the paw. The interior surface 26 may be made of rubber, plastic, or any other material suitable for cleaning the paw. The interior surface 26 may contain a decorative color or pattern to assist in its use and it 26 may also be removable to allow for cleaning or replacement. Additionally, the interior surface 26 may be constructed from the same material as the sidewall 12.

The interior surface 26 may also substantially seal to the paw due to the size and configuration of the sidewall 12. Thus, the suction effect may be created as the paw is withdrawn from the apparatus 10 due to the snug fit of the paw within the apparatus 10. The suction effect may then be created by the both the interior surface 26 and the rim 16. Therefore, the paw may be cleaned by contact with the interior surface 26 and the suction effect by inserting the paw through the rim 16 into the apparatus 10, agitating the paw along the interior surface 26, and withdrawing the paw from the apparatus 10.

Figure 3:
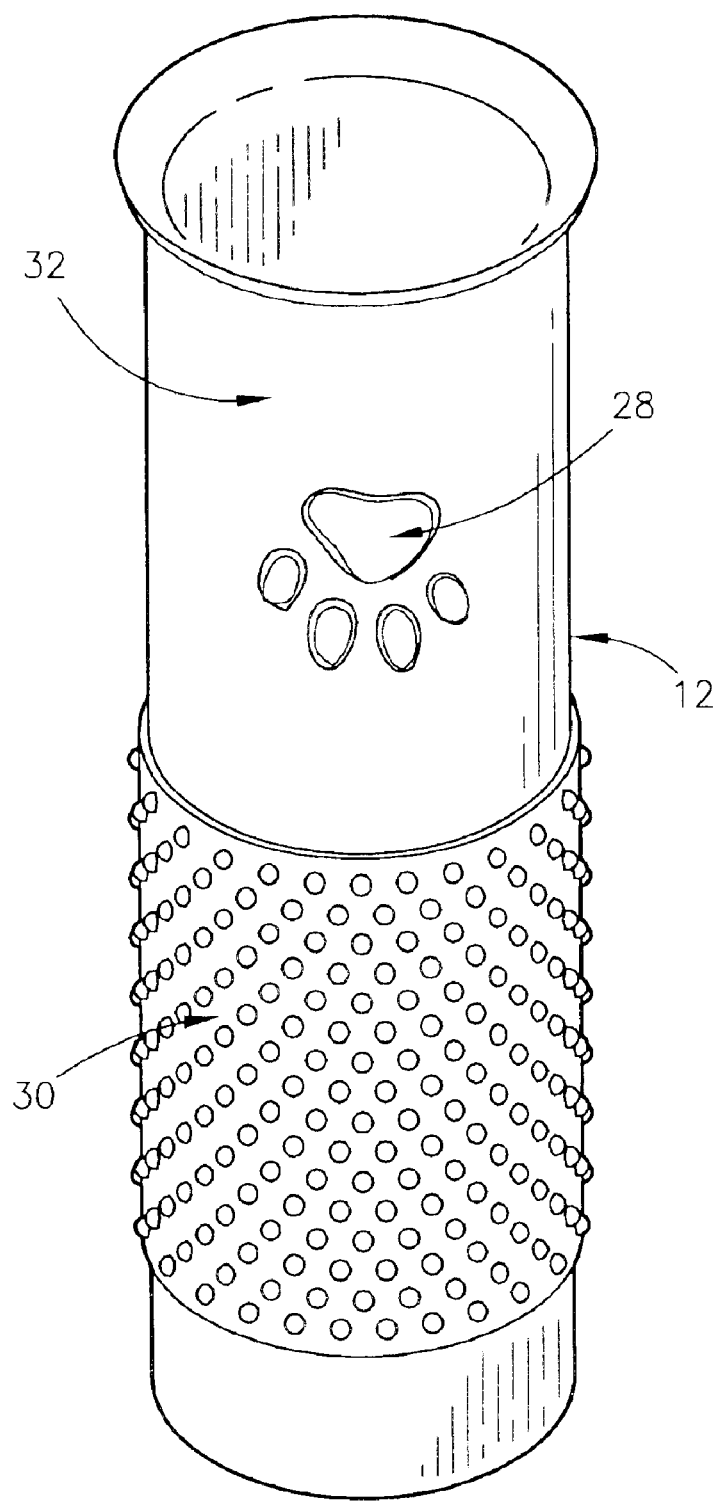
FIG. 3 is a perspective view of another embodiment of the apparatus showing an exterior surface of the apparatus.

In another embodiment illustrated in FIG. 3, identifying markings 28 and a gripping element 30 are positioned on an exterior surface 32 of the sidewall. The markings 28 may be a graphic design, a logo, a collection of shapes, or words or phrases which allow the apparatus 10 to be readily and quickly identified. The gripping element 30 assists with gripping and holding onto the apparatus 10, thereby eliminating any problem caused by liquids and other slick solutions on the exterior surface 32. The gripping element 30 may be a series of bumps aligned on a non-slip plastic coating which forms an annular ring around the exterior surface 32. The gripping element 30 may be removable from the exterior surface 32, or it may be permanently attached.

The cleaning element 20 may be located anywhere within the apparatus 10 and may be a single element or combination of elements and surfaces. The cleaning element 20, or portions thereof, may be removably or permanently attached to the apparatus 10 or the interior surface 26.

Figure 4:
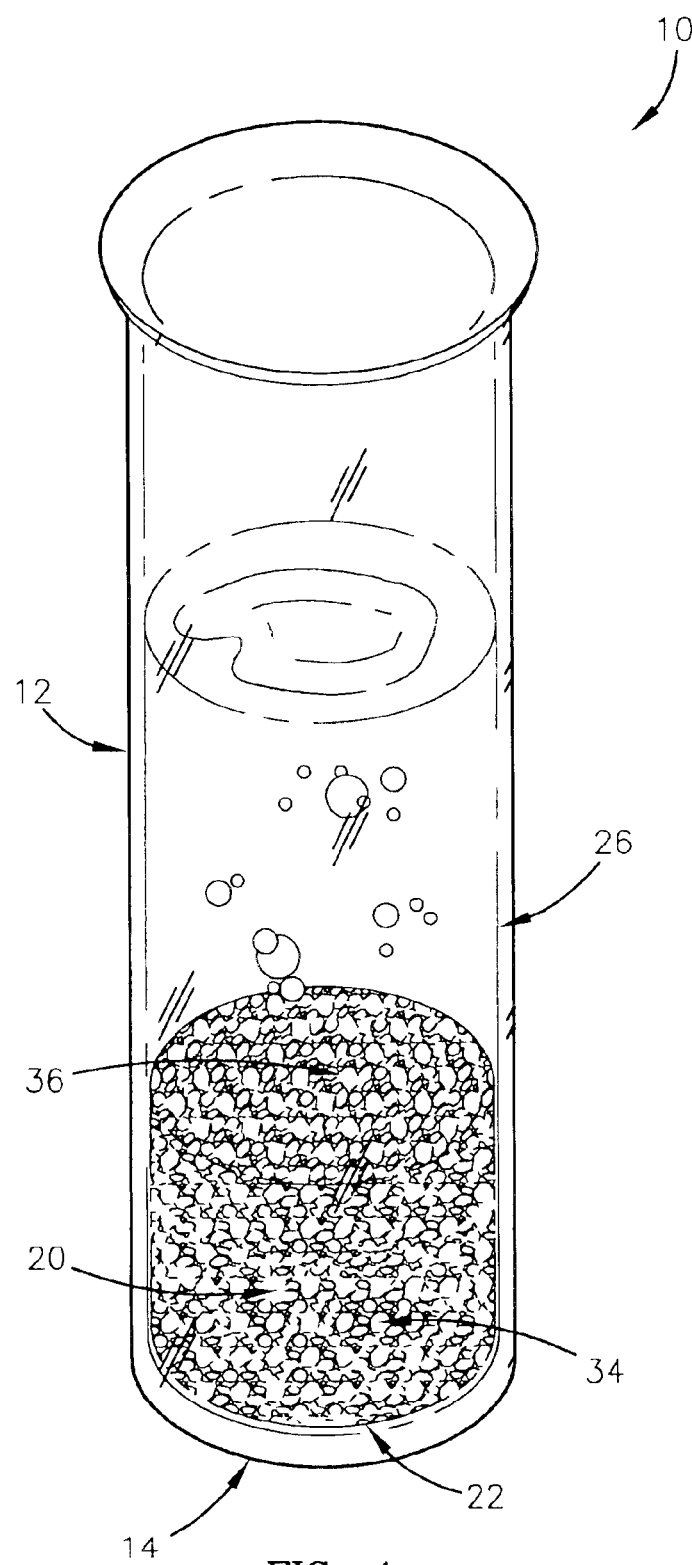
FIG. 4 is a perspective view of another embodiment of the apparatus having a cleaning element comprising a sponge.

In the embodiment of FIG. 4, the cleaning element 20 comprises a sponge 34 located adjacent the interior portion 22 of the end wall 14. The sponge 34 scours the paw thereby removing dirt and debris from the paw. The sponge 34 has a diameter substantially equal to the internal diameter of the sidewall 12 and a thickness of approximately one inch to provide a proper cleaning surface 36; however, the diameter and thickness of the sponge 34 may be any size sufficient to aid in the cleaning of the paw. The cleaning surface 36 of the sponge 34 may contain a scouring pad to further aid in cleaning the paw. The sponge 34 may be organic or synthetic and have a texture selected based on the size of the paw. The color of the sponge 34 may match that of the apparatus 10. Furthermore, the sponge 34 may be located anywhere within the apparatus 10 and may be removably attached to the apparatus 10 or interior surface 26 through the connecting element, hooks, latches, or other means so that it may be removed, cleaned, and reinserted in the apparatus 10. Alternatively, the sponge 34 may be permanently attached to the apparatus 10 or interior surface 26.

Figure 5:
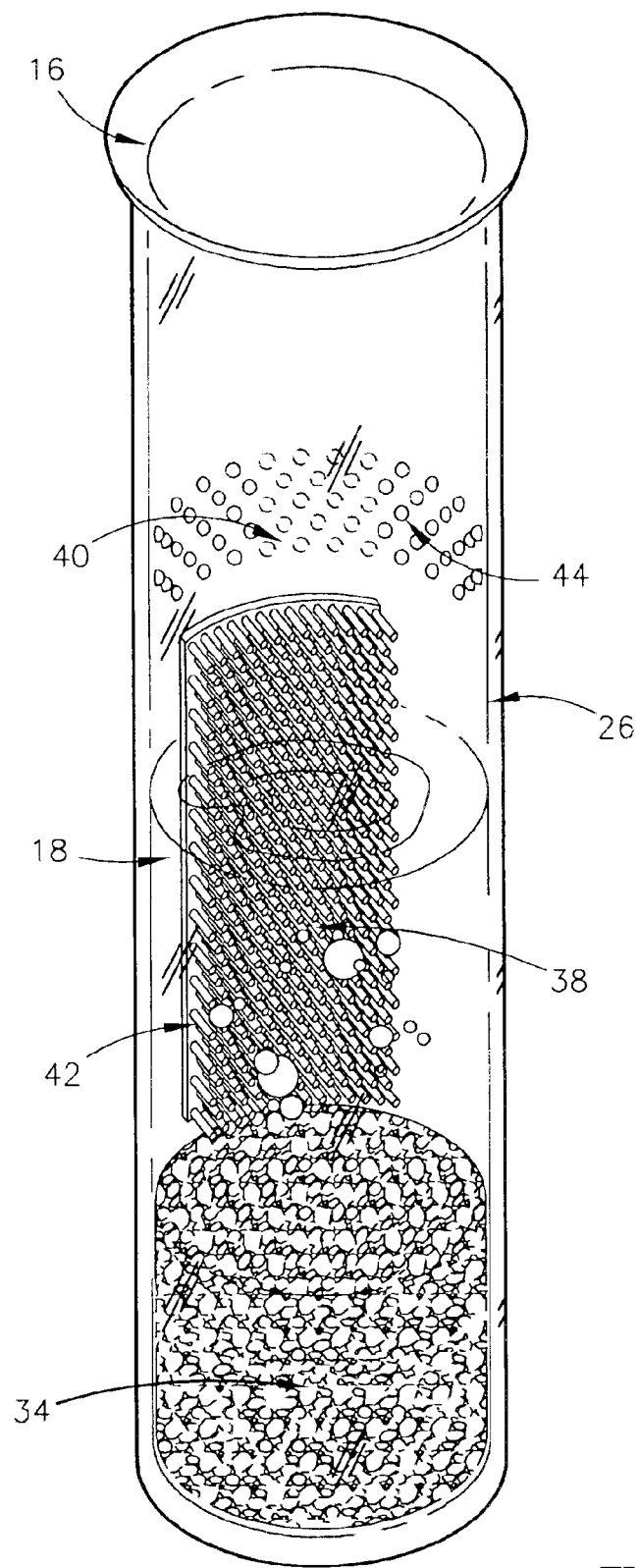
FIG. 5 is a perspective view of another embodiment of the apparatus wherein the cleaning element comprises the sponge, a brush, and a plurality of projections.

In the embodiment of FIG. 5, the cleaning element 20 is a combination of the sponge 34, a brush 38, and a plurality of projections 40. The sponge 34, the brush 38 and/or the projections 40 may be removable from the apparatus 10 so that they may be easily cleaned. The brush 38 may consist of a plurality of bristles 42 fastened into a base which is attached to the interior surface 26. The bristles 42 may be of any shape, consistency and length suitable for scrubbing the paw. The plurality of projections 40 may be any combination of bumps 44, nubs, fingers, or other such protrusion for contacting the paw. The projections 40 may extend in any direction from the interior surface 26 provided that they contact the paw when the paw is inserted into the apparatus 10. The projections 40 may be constructed of plastic or any other suitable material. The brush 38 and the projections 40 function by scrubbing against the paw thereby removing dirt and other debris. Thus, the paw may be cleaned by scouring with the sponge 34, scrubbing with the brush 38 and the projections 40, and the suction effect created by the rim 16 substantially sealing to the paw.

In operation, the apparatus 10 is partially filled with the liquid 18. The liquid 18 may be a cleaning solution, water, water with detergent, shampoo, or any other liquid suitable for washing the paw. The user then inserts the animal's paw through the rim 16 and into the liquid 18. Once the animal's paw is inserted in the apparatus 10, the user agitates the apparatus 10 or the paw such that the paw contacts and is cleaned by the cleaning element 20. For example, if the cleaning element 20 is a sponge 34 attached to the interior portion 22 of the end wall 14, the user would agitate the paw so that the surface 36 of the sponge 34 would scour the paw, thus removing dirt and debris from the paw. Alternatively, even if the apparatus 10 does not contain a cleaning element 20, a user may agitate the apparatus 10 or the paw such that the paw contacts and is cleaned by the interior surface 26. If the sidewall 12 is comprised of the transparent material, the user may view the paw's position in the apparatus 10 and monitor the cleaning process to ensure that the paw is sufficiently cleaned by contacting the cleaning element 20 or the interior surface 26.

After the paw is sufficiently agitated, the user withdraws the paw from the apparatus 10. As the paw is withdrawn from the apparatus 10, the suction effect is created by the rim 16. The suction effect draws water, dirt, debris, and other waste away from the paw which remain in the apparatus 10 until the user dumps the contents of the apparatus 10 into a drain or other receptacle. The apparatus 10 may then be stored without any further attention until its next use.

Although the invention has been described with reference to the preferred embodiment illustrated in the attached drawing figures, it is noted that equivalents may be employed and substitutions may be made herein without departing from the scope of the invention as recited in the claims.

Having thus described the preferred embodiment of the invention,

What is claimed as new and desired to be protected by Letters Patent includes the following:

1. An apparatus for cleaning an animal's paw, the apparatus comprising:
    an elongated, rigid, cylindrical sidewall;
    an end wall closing one end of the sidewall such as to allow the apparatus to contain a liquid;
    a fluted open rim positioned on the end of the sidewall opposite to the end wall, wherein the rim is sized and configured to receive the paw and substantially seal to the paw so as to create a suction effect as the paw is withdrawn from the apparatus;
    a series of bumps aligned on a non-slip plastic coating which forms an annular ring around an exterior surface of the sidewall; and
    a cleaning element positioned within the sidewall, wherein the cleaning element is removable from the apparatus, such that the cleaning element may be removed and repositioned along an interior surface of the sidewall.

2. The apparatus of claim 1, wherein the cleaning element comprises a sponge operable to scour the paw.

3. The apparatus of claim 1, wherein the cleaning element comprises a brush operable to scrub the paw.

4. The apparatus of claim 1, wherein the cleaning element comprises a plurality of projections extending from the interior surface of the sidewall and operable to scrub the paw.

5. The apparatus of claim 1, the apparatus further including identifying markings on an exterior surface of the sidewall.

6. The apparatus of claim 1, wherein the rim is fluted such that the paw is guided into the apparatus by the shape of the rim.

7. The apparatus of claim 1, wherein the length of the sidewall is between two inches and fourteen inches and the internal diameter of the sidewall is between three-quarters of an inch and four inches.

8. The apparatus of claim 1, wherein at least a portion of the apparatus is substantially transparent to allow the paw to be viewed through the apparatus.

9. An apparatus for cleaning an animal's paw, the apparatus comprising:
    an elongated, rigid, cylindrical, sidewall having a length between two inches and fourteen inches and an internal diameter between three-quarters of an inch and four inches; and
    an end wall closing one end of the sidewall such as to allow the apparatus to contain a liquid;
    a fluted open rim positioned on the end of the sidewall opposite to the end wall, wherein the rim is shaped, sized and configured to receive the paw, guide the paw into the apparatus, and substantially seal to the paw so as to create a suction effect as the paw is withdrawn from the apparatus; and
    a cleaning element positioned within the sidewall and operable to clean the animal's paw, wherein the cleaning element may be removed and repositioned along an interior surface of the sidewall.

10. The apparatus of claim 9, wherein an interior surface of the sidewall rubs the animal's paw to dislodge water, dirt, and debris from the paw.

11. The apparatus of claim 9, wherein the cleaning element comprises a sponge operable to scour the animal's paw.

12. The apparatus of claim 9, wherein the cleaning element comprises a brush operable to scrub the animal's paw.

13. The apparatus of claim 9, wherein the cleaning element comprises a plurality of projections extending from an interior surface of the sidewall and operable to scrub the paw.

14. The apparatus of claim 9, wherein at least a portion of the apparatus is substantially transparent to allow the paw to be viewed through the apparatus.

15. The apparatus of claim 9, wherein the apparatus further includes a gripping element positioned on the exterior surface to aid a user in gripping the apparatus, the gripping element comprising a series of bumps which form an annular ring around an exterior surface of the sidewall.

16. An apparatus for cleaning an animal's paw, the apparatus comprising:

an elongated, rigid, cylindrical sidewall constructed from a transparent material which is capable of retaining a liquid, wherein the sidewall has a length of approximately six inches, an internal diameter of approximately two inches, an external diameter of approximately two and one-fourth inches, and a thickness of approximately one-eighth of an inch;

an end wall closing one end of the sidewall such as to allow the apparatus to contain a liquid and having a substantially flat exterior portion to allow the apparatus to stand upright;

a fluted open rim positioned on an end of the sidewall opposite to the end wall wherein the rim is shaped, sized and configured to receive the paw, guide the paw into the apparatus, and substantially seal to the paw so as to create a suction effect as the paw is withdrawn from the apparatus;

an exterior surface of the sidewall including an identifying marking for readily identifying the apparatus and a gripping element to aid in gripping the apparatus; and an interior surface of the sidewall operable for cleaning the paw through contact with the paw;

a cleaning element positioned within the sidewall and operable to clean the paw including a sponge removably attached adjacent the end wall, having a diameter substantially equal to the internal diameter of the sidewall, a thickness of approximately one inch, and a cleaning surface operable for cleaning the paw through contact with the paw, wherein the cleaning element may be removed and repositioned along an interior surface of the sidewall; and a gripping element comprising a series of bumps aligned on a non-slip plastic coating which forms an annular ring around an exterior surface of the sidewall.

17. A method of cleaning an animal's paw, which comprises:

partially filling an apparatus having an elongated, rigid, cylindrical sidewall and a closed end wall with a liquid;

inserting the animal's paw through an open rim of the sidewall and into the apparatus so that the paw substantially seals to the rim;

agitating the paw within the apparatus so that the paw is cleaned by contacting the sidewall's interior surface and a cleaning element; and withdrawing the paw from the apparatus, thereby creating a suction effect caused by the paw substantially sealing to the rim, wherein the suction effect pulls water, dirt and debris away from the paw.

18. An apparatus for cleaning an animal's paw, the apparatus comprising:

an elongated, rigid, cylindrical sidewall;

an end wall closing one end of the sidewall such as to allow the apparatus to contain a liquid;

an open rim positioned on the end of the sidewall opposite to the end wall, wherein the rim is sized and configured to receive the paw and substantially seal to the paw so as to create a suction effect as the paw is withdrawn from the apparatus;

a series of bumps aligned on a non-slip plastic coating which forms an annular ring around an exterior surface of the sidewall; and a sponge operable to scour the paw and positioned within the sidewall.

* * * * *

(12) EX PARTE REEXAMINATION CERTIFICATE (9947th)
United States Patent
Mulich et al.

(10) Number: US 6,851,391 C1
(45) Certificate Issued: Nov. 18, 2013

(54) APPARATUS FOR CLEANING AN ANIMAL'S PAW

(75) Inventors: Katie Mulich, Louisberg, KS (US); Michael Mulich, Louisberg, KS (US)

(73) Assignee: Paw Wash LLC, Leawood, KS (US)

Reexamination Request:
No. 90/012,158, Mar. 21, 2012

Reexamination Certificate for:
Patent No.: 6,851,391
Issued: Feb. 8, 2005
Appl. No.: 10/623,297
Filed: Jul. 18, 2003

(51) Int. Cl.
*A01K 13/00* (2006.01)

(52) U.S. Cl.
USPC ......... 119/651; 119/664; 119/673; 15/104.92

(58) Field of Classification Search
None
See application file for complete search history.

(56) References Cited

To view the complete listing of prior art documents cited during the proceeding for Reexamination Control Number 90/012,158, please refer to the USPTO's public Patent Application Information Retrieval (PAIR) system under the Display References tab.

*Primary Examiner* — Jeffrey L. Gellner

(57) ABSTRACT

An apparatus (10) for cleaning an animal's paw broadly comprises an elongated rigid cylindrical sidewall (12) having an end wall (14) and an open rim (16) which substantially seals to an animal's paw as the paw is withdrawn from the apparatus (10). The rim (16) is preferably fluted such that the paw is guided into the apparatus (10) without snagging or catching. A cleaning element (20) may be located within the apparatus (10) to assist in cleaning the paw. The cleaning element (20) may be a sponge (34), a brush (38), a plurality of projections (40), or other related object. In use, the apparatus (10) is partially filled with a liquid (18) and the paw is inserted through the rim (16) and into the apparatus (10). A user then agitates the paw within the apparatus (10) such that the paw is cleaned by contacting the cleaning element (20). The user then withdraws the paw from the apparatus (10), thereby creating a suction effect which draws additional dirt and debris away from the paw.

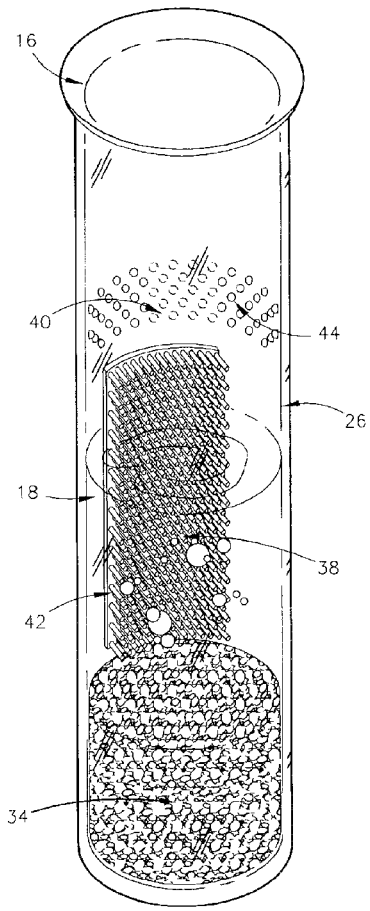

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-4, 11-13, 17 and 18 are cancelled.

Claims 1, 6 and 9 are determined to be patentable as amended.

Claims 5, 7, 8, 10, 14 and 15, dependent on an amended claim, are determined to be patentable.

Claim 16 was not reexamined.

1. An apparatus for cleaning an animal's paw, the apparatus comprising:
   an elongated, rigid, cylindrical sidewall;
   an end wall closing one end of the sidewall such as to allow the apparatus to contain a liquid;
   a fluted open rim positioned on the end of the sidewall opposite to the end wall, wherein the rim is sized and configured to receive the paw and substantially seal to the paw so as to create a suction effect as the paw is withdrawn from the apparatus;
   a series of bumps aligned on a non-slip plastic coating which forms an annular ring around an exterior surface of the sidewall; and
   a cleaning element positioned within the sidewall, wherein the cleaning element is removable from the apparatus, such that the cleaning element may be removed and repositioned along an interior surface of the sidewall, *the cleaning element being a combination of a sponge, a brush and a plurality of projections, the plurality of projections including a plurality of fingers, the sponge being positioned proximate the end wall, the plurality of protrusions being positioned distal the end wall, and the brush being positioned intermediate the sponge and the protrusions.*

6. The apparatus of claim 1, wherein the rim is fluted such that the paw is guided into the apparatus by the shape of the rim, *the fluted rim extending outwardly from the end of the sidewall opposite to the end wall such that an outer edge of the fluted rim presents a larger diameter than the side wall and a surface of the fluted rim extends inwardly from the outer edge toward the side wall at an angle relative to the side wall.*

9. An apparatus for cleaning an animal's paw, the apparatus comprising:
   an elongated, rigid, cylindrical, sidewall having a length between two inches and fourteen inches and an internal diameter between three-quarters of an inch and four inches; and
   an end wall closing one end of the sidewall such as to allow the apparatus to contain a liquid;
   a fluted open rim positioned on the end of the sidewall opposite to the end wall, wherein the rim is shaped, sized and configured to receive the paw, guide the paw into the apparatus, and substantially seal to the paw so as to create a suction effect as the paw is withdrawn from the apparatus, *the fluted open rim extending outwardly from the end of the sidewall opposite to the end wall such that an outer edge of the fluted rim presents a larger diameter than the side wall and a surface of the fluted rim extends inwardly from the outer edge toward the side wall at an angle relative to the side wall*; and
   a cleaning element positioned within the sidewall and operable to clean the animal's paw, wherein the cleaning element may be removed and repositioned along an interior surface of the sidewall, *the cleaning element being a combination of a sponge, a brush and a plurality of projections, the plurality of projections including a plurality of fingers, the sponge being positioned proximate the end wall, the plurality of protrusions being positioned distal the end wall, and the brush being positioned intermediate the sponge and the protrusions.*

\* \* \* \* \*